W. E. THOMPSON.
SPLIT BEARING AND SHIM THEREFOR.
APPLICATION FILED OCT. 19, 1918.
1,294,848. Patented Feb. 18, 1919.
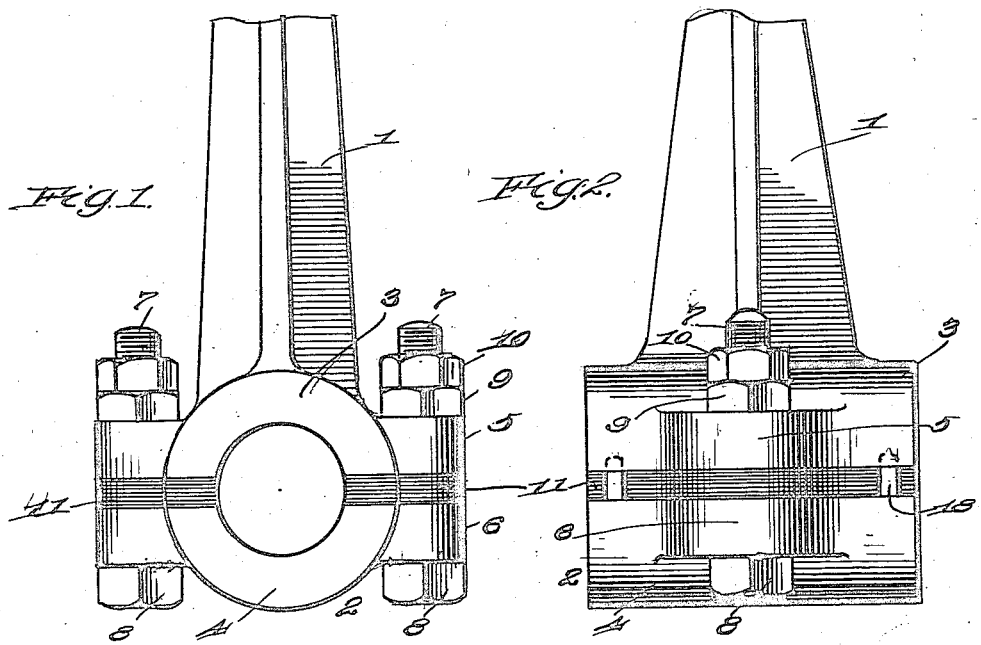
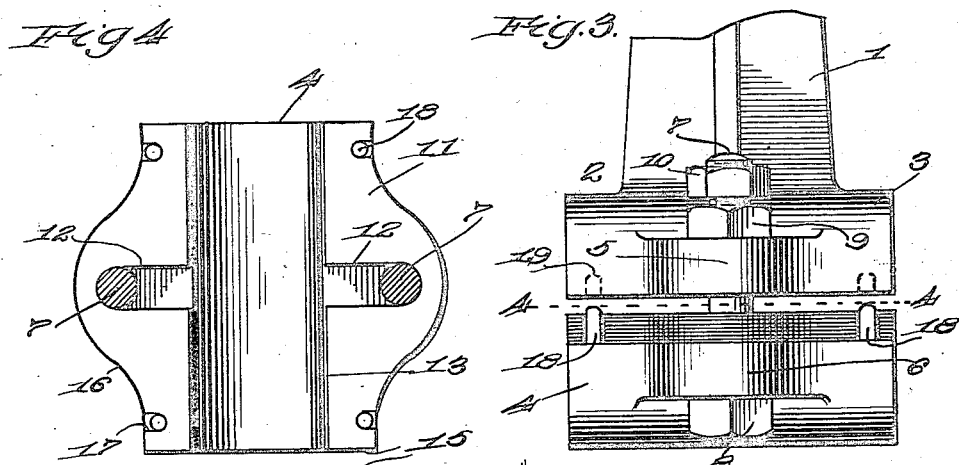
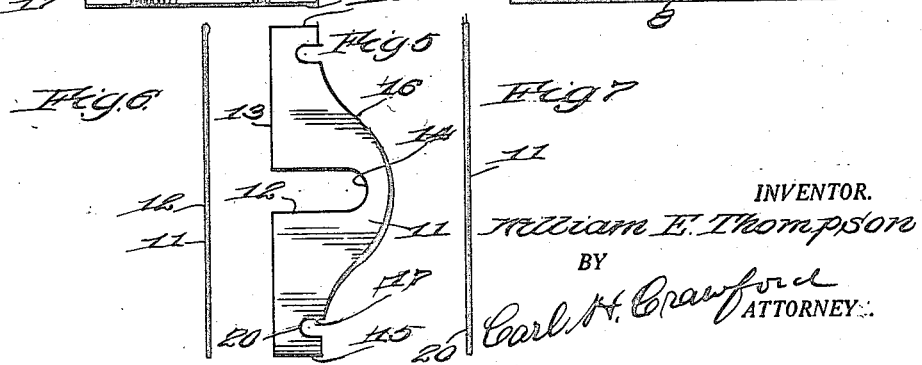
INVENTOR.
William E. Thompson
BY
Carl H. Crawford
ATTORNEY.

UNITED STATES PATENT OFFICE.

WILLIAM E. THOMPSON, OF FARMINGTON, WASHINGTON.

SPLIT BEARING AND SHIM THEREFOR.

1,294,848.   Specification of Letters Patent.   Patented Feb. 18, 1919.

Application filed October 19, 1918. Serial No. 258,776.

*To all whom it may concern:*

Be it known that I, WILLIAM E. THOMPSON, a citizen of the United States, residing at Farmington, in the county of Whitman and State of Washington, have invented new and useful Improvements in Split Bearings and Shims Therefor, of which the following is a specification.

This invention relates to improvements in shims and bearing boxes.

In all high speed machinery, split boxes are babbitted, to take the wear, and shims or spacing plates are interposed between the split sections of the bearing box, and as the "knock" or "knocks" develop, or in other words, as the babbitt begins to wear and give play to the journal, this play is taken up by the removal of one or more of the shims. In the prevalent form, the sections of the bearing box are united by bolts extending through bosses, and these bolts now extend through circular openings in the shims, to hold the shims in place when the box is assembled. Further, on all high speed machines, these bolts are threaded with very fine threads, the nuts having not only the usual lock nuts but keys, to hold the lock nuts.

Therefore, in the present operation of removing a shim or shims, it is necessary to entirely remove the key of a box bolt and completely turn off the nut and the lock nut, and then remove the bolt from the box, on both sides thereof. The cap or removable section of the bearing is then free and one or more of the shims may be taken off. However, this operation consumes a great deal of time, and if the operator is not careful, he is liable to drop the cap section, or some of the shims, and this would additionally require cleaning of the parts. In the removal of caps from the connecting rod bearings of high speed explosion engines on big tractors, the nuts and lock nuts are usually so close to the rod, that even with a ratchet wrench, an hour or two is frequently consumed in taking off two shims.

The primary object of this invention is to provide means whereby a shim may be removed from between the sections of a split bearing by merely loosening the holding bolt nuts and slightly separating the sections of the bearing.

A further object is to provide means for holding the shims in position while the sections of the separated bearing are in spaced relation so that removal of one shim will not in any way displace the remaining shims.

The invention also resides in an improved form of shim, as an article of manufacture, and also in combination with a split bearing, this novel shim equipped with means whereby it can coact with the holding bolt, when in position, and whereby it can be withdrawn past such bolt after the nuts of the latter have been loosened, and without removing the bolt.

A further feature consists in providing means on the bearing box, and so equipping the novel shim that the latter will be positively held in position, prior to tightening the nuts, by coaction with the box bolt and with said means.

Further novel objects and features will be more fully described in connection with the accompanying drawing, and will be more particularly pointed out in and by the appended claims.

In the drawing:—

Figure 1, is a view in elevation of the crank-shaft end of a connecting rod showing the application of the device of my invention thereto.

Fig. 2, is a similar view looking from the left of Fig. 1.

Fig. 3, is a view similar to Fig. 2, with the nuts loosened to lower the cap sufficiently to withdraw a shim.

Fig. 4, is a sectional view on line 4—4 of Fig. 3.

Fig. 5, is a face view of one of the shims removed from the bearing box.

Fig. 6, is an edge view of the shim looking from the left of Fig. 5.

Fig. 7, is an edge view looking from the right of Fig. 5.

Like characters of reference designate similar parts throughout the different figures of the drawing.

As illustrated, 1 designates a portion of a connecting rod of an explosion or other engine which terminates in a split bearing indicated as a whole by 2. The bearing has a base section 3, which is integral with the connecting rod, and the bearing also includes a cap section 4. These sections are usually provided with bolt bosses 5 and 6, through which bolts 7 extend to unite the sections in tight relation about the crank shaft (not shown) or any other shaft journaled therein. These bolts have heads 8 which bear against the cap bosses 6, and holding and locking nuts 9 and 10, respectively, the former bearing against bosses 5. In addition to the lock nuts 10, keys (not shown) are generally provided on boxes for high speed machinery. Likewise, the bolts are provided with threads of a low pitch, and of a large number per inch, as it is necessary to unite the bearing sections in very firm relation.

These bearings are babbitted to take the wear, and shims 11, are interposed between the sections to space the latter apart the required distance before the babbitt has worn down. As the babbitt wears, the shims are withdrawn to permit of closing the sections to take up play.

My improved shims 11, are shown equipped with means whereby they are loosely engaged with portions of the bearing with a view of facilitating withdrawal of the shims without removing the bolts 7, the withdrawal of the shims being laterally of the axis of the bolt or bolts. In the form shown, the improved shims are releasably connected not only with the bolts but also with portions of the bearing, and these releasable connections coact to hold the shims in position while the bearing is being assembled and also when the sections of the bearing are separated for the removal of shims.

Referring to the specific form shown, each shim 11, has a slot 12 which extends inwardly from one edge, preferably the shaft edge 13, and which is of sufficient width so that its bight 14 will engage bolt 7, with a view of preventing the shim from extending radially inward of the bearing beyond a predetermined extent. The shaft edge 13, of the shim is a straight edge, likewise the end edges 15, but the outer edge 16 is of a configuration similar to that of the outer contour of the box. It is highly advantageous although not absolutely necessary to firmly hold the shims 11 in position at all times when the box sections are separated. Therefore, means has been provided for the performance of this function.

Each shim is shown provided with holding notches 17, on opposite sides of the slot 12, and which notches open through a different edge from edge 13. As shown, these notches 17 open through the outer edge 16, which is opposite to edge 13. One of said sections, preferably that one which is lowermost, namely the cap 4, is provided with holding studs 18 which project upwardly from the face of cap 4, a distance slightly in excess of the maximum number of shims that would ever be employed. These studs 18 are also shown located just inside the outer edge of the cap. Suitable sockets 19, are formed in the base section 3, to receive the studs 18, when the sections are bolted in close relation.

Now it will be seen that the studs 18 engage the bights 20, of the notches 17 to prevent shifting of the shims outwardly or endwise while the bolt 7, engages the bight 14 to prevent inward shifting movement of the shims. Thus, the operator may feel free to release the nuts and lower the cap 4 without danger of the shims getting out of place.

When wear on the babbitt results in the usual "knock", the nuts are loosened as shown in Fig. 3, and the uppermost shim is free to be withdrawn. This top shim is lifted over the tops of the studs 18, and the slot 12 permits the shim to be withdrawn outwardly past the bolt 7, at substantially at right angles to the axis of said bolt. Now the amount of turning of the nuts necessary to lower the cap 4, to the position shown in Fig. 3, is very materially less than the amount of turning that would be necessary to entirely remove the bolts from the sections 3 and 4. Thus, when a rancher is out in the field, and he hears a "knock", it is only a matter of a few minutes work to take out a shim on each side of the bearings effected.

It is believed that the novelty and utility of my invention will be fully understood from the foregoing description, and while I have herein shown and described one form of my invention, I do not wish to be limited thereto except for such limitations as the claims may import.

I claim:—

1. In combination, a split bearing comprising base and cap sections, a bolt extending through said sections to unite the same, shims interposed between said sections and being slotted from their shaft edges outwardly and the bights of said slots engaging said bolt, whereby any one of said shims may be withdrawn outwardly from the shaft by slightly separating the bearing sections.

2. In combination, a split bearing comprising base and cap sections, a bolt extending through said sections to unite the same, shims interposed between said sections and being slotted from their shaft edges outwardly and the bights of said slots engaging said bolt, one of said sections having means engaging said shims in coacting relation with said bolt to hold said shims in position, whereby upon slight separation of said sections a shim may be released from said means and withdrawn passed said bolt.

3. In combination, a split bearing comprising base and cap sections, a bolt extending through said sections to unite the same shims interposed between said sections and being slotted from their shaft edges outwardly and the bights of said slots engaging said bolt, one of said sections having projections on opposite sides of said bolt for engagement with the outer edges of said shims in coacting relation with said bolt to hold said shims in position, whereby upon slight separation of said sections a shim may be released from said projections and withdrawn passed said bolt.

4. In combination, a split bearing comprising base and cap sections, a bolt extending through said sections to unite the same, shims interposed between said sections and being slotted from their shaft edges outwardly and the bights of said slots engaging said bolt, one of said sections having projections on opposite sides of said bolt for engagement with the outer edges of said shims in coacting relation with said bolt to hold said shims in position and the remaining section having recesses to receive said projections when said sections are united in close relation, whereby upon slight separation of said sections one of said shims may be released from said projections and withdrawn outwardly passed said bolt.

5. In combination, a split bearing comprising base and cap sections, a bolt extending through said sections to unite the same, shims interposed between said sections and being slotted from their shaft edges outwardly and the bights of said slots engaging said bolt, said shims being notched from their outer edges inwardly on opposite sides of said bolt, and one of said sections having projections engaging said notches in coacting relation with said bolt to hold said shims in position and the remaining section having recesses to receive said projections when said sections are united in closed relation, whereby upon slight separation of said sections one of said shims may be withdrawn over said projections and passed said bolt without removing said bolt from said sections.

6. In combination, a split bearing comprising base and cap sections, shims interposed between said sections, and means releasably engaging said shims and uniting said sections, whereby slight release of said means will free said shims for removal from between said sections.

7. In combination, a split bearing comprising base and cap sections, shims interposed between said sections, means for uniting said sections in close relation to bind said shims or releasing said sections for slight separation thereof, said bearing having means releasably engaging said shims to hold the latter in position when said sections are separated to permit withdrawal of one of said shims.

8. As a new article of manufacture of the class described, a shim for a split bearing having a slot opening from that edge of the shim nearest the shaft bore of the bearing and extending toward the outer edge of the shim.

9. As a new article of manufacture of the class described, a shim for a split bearing having a slot opening from that edge of the shim nearest the shaft bore of the bearing and extending toward the outer edge of the shim, and said shim having holding notches in its outer edge.

10. In combination, a split bearing comprising base and cap sections, a bolt extending through said sections to unite the same, shims interposed between said sections and being slotted from one of their edges inwardly for passage therethrough of said bolt, whereby one of said shims may be withdrawn away from said bolt without removing the latter.

11. In combination, a split bearing comprising a base and cap sections, a bolt extending through said sections, and shims interposed between said sections and releasably engaged with said bolt for withdrawal from between said sections laterally of the longitudinal axis of said bolt.

12. In combination, a split bearing comprising base and cap sections, means for uniting said sections, and shims removable from between said sections independently of said means when said sections are in slightly separated relation.

In testimony that I claim the foregoing as my own, I hereby affix my signature.

WILLIAM E. THOMPSON.